(12) United States Patent
Huang (10) Patent No.: US 6,909,085 B2
(45) Date of Patent: Jun. 21, 2005

(54) SECURING DEVICE (75) Inventor: Kuo-Ching Huang, Taipei (TW)

(73) Assignee: Primax Electronics, Ltd. (TW)

( * ) Notice: Subject to any disclaimer, the term of this patent is extended or adjusted under 35 U.S.C. 154(b) by 215 days.

(21) Appl. No.: 10/456,885

(22) Filed: Jun. 6, 2003

(65) Prior Publication Data
US 2004/0211893 A1 Oct. 28, 2004

(30) Foreign Application Priority Data
Apr. 24, 2003 (TW) .................................. 92109534 A (51) Int. Cl.⁷ .............................. H01J 40/14; H01J 5/02
(52) U.S. Cl. ....................................................... 250/239
(58) Field of Search .............................. 250/239, 208.1; 358/473–474, 482–484, 493–497

(56) References Cited

U.S. PATENT DOCUMENTS 4,581,657 A * 4/1986 Takano ....................... 358/483

FOREIGN PATENT DOCUMENTS

JP 2000-269581 9/2000

* cited by examiner

Primary Examiner—David Porta
Assistant Examiner—Suezu Ellis
(74) Attorney, Agent, or Firm—Madson & Metcalf (57) ABSTRACT A securing device includes a sustaining member, a plurality of threaded holes, and a plurality of screws. The sustaining member includes a clamped portion and a securing portion extending from the clamped portion. The clamped portion is interfaced between the photoelectric conversion device and the carriage module housing. The thickness of the clamped portion is even enough to keep the distance between the photoelectric conversion device and the carriage module housing constant, thereby assuring that the photoelectric conversion device is orthogonal to the central line of a lens in the carriage module housing. The securing portion is flexible so as to facilitate the assembling operation of the circuit board, the photoelectric conversion device and the carriage module housing by way of the threaded holes and screws.

20 Claims, 7 Drawing Sheets

SECURING DEVICE

FIELD OF THE INVENTION

The present invention relates to a securing device, and more particularly to a securing device for mounting a photoelectric conversion device to a carriage module housing.

BACKGROUND OF THE INVENTION

Figure 1:
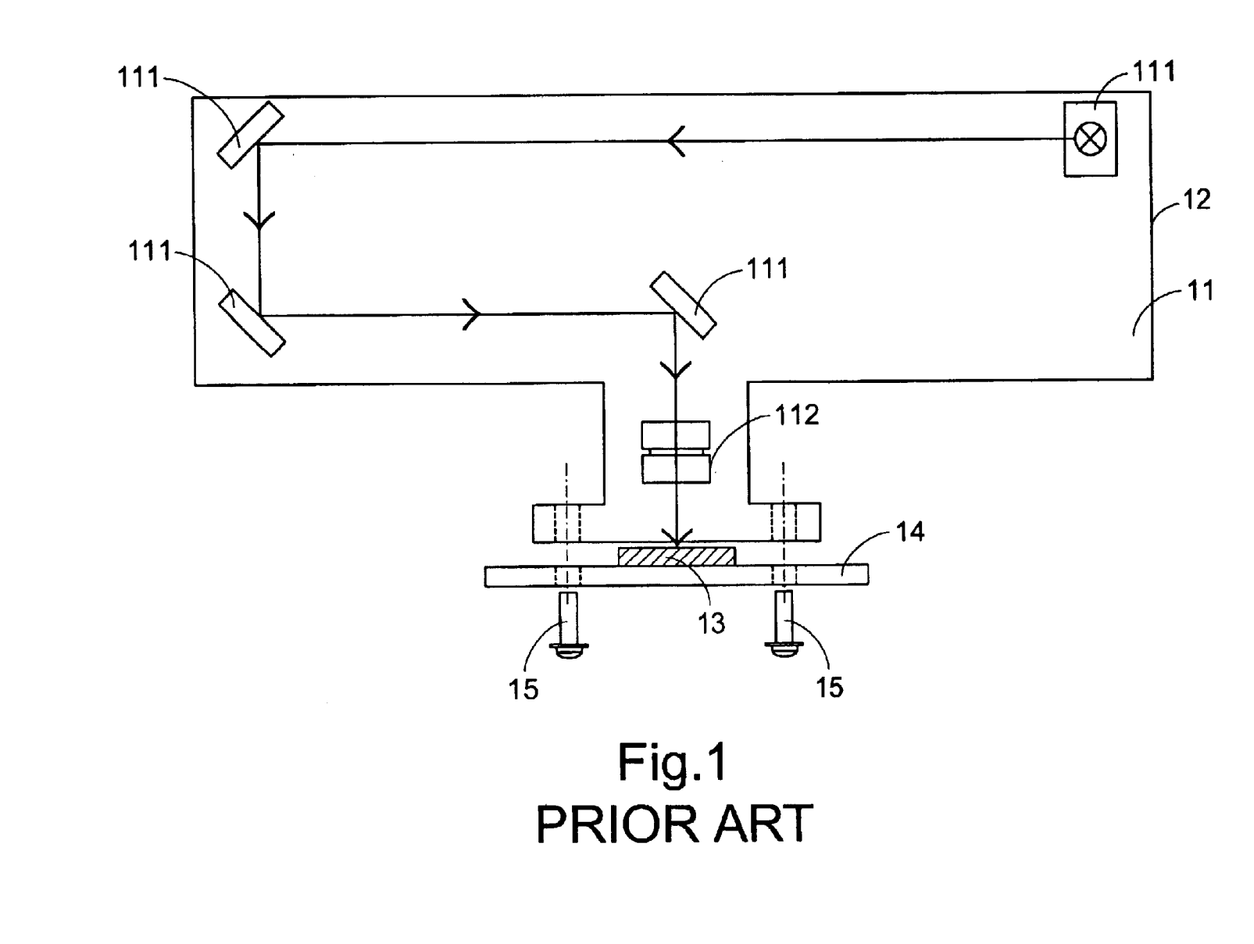
FIG. 1 is a schematic cross-sectional diagram showing a conventional assembly of a carriage module, a CCD and a circuit board.
Figure 2A:
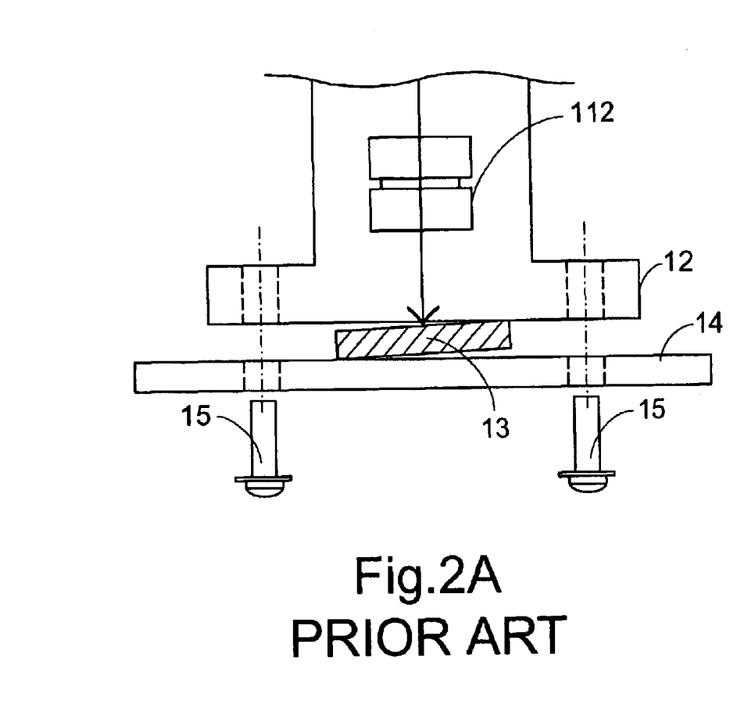
FIG. 2A is a partially enlarged view illustrating a defective situation resulting from floating welding of the CCD to circuit board.
Figure 2B:
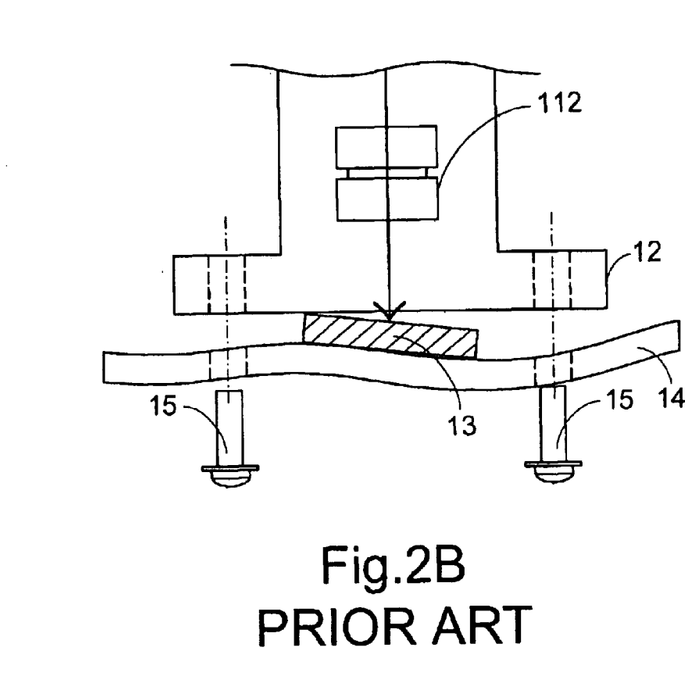
FIG. 2B is a partially enlarged view illustrating a defective situation resulting from a non-flat circuit board.

Please refer to FIG. 1 which is a schematic diagram showing a carriage module of a conventional image scanner. The carriage module includes an optical mechanism 11 accommodated in a housing 12 and a charge coupled device (CCD) 13 secured to the housing 12. As indicated by the arrows, the light reflected from an object to be scanned is focused by a lens device 112 via the guidance of the reflective mirrors 111, and then transferred to the CCD 13. In the carriage module structure of FIG. 1, the CCD 13 is secured onto a printed circuit board (PCB) 14, and further secured to the housing 12 of the carriage module by attaching the PCB 14 to the carriage housing 12 with screws 15. By moving the lens device 112, the object length, i.e. the distance between the scanned object and the lens 112, is adjusted. Since the CCD 13 is welded to the PCB 14, floating welding situation may occur, as shown in FIG. 2A. Consequently, the CCD face will not be perpendicular to the central line of the lens 112. Even if the CCD 13 is well welded to the PCB 14, the deflection situation of the CCD 13 relative to the carriage module 11 may also occur for a non-flat PCB, as shown in FIG. 2B. As such, the focusing results at different positions of the CCD 13 will vary. Thus, the scanning quality is deteriorated.

Figure 3:
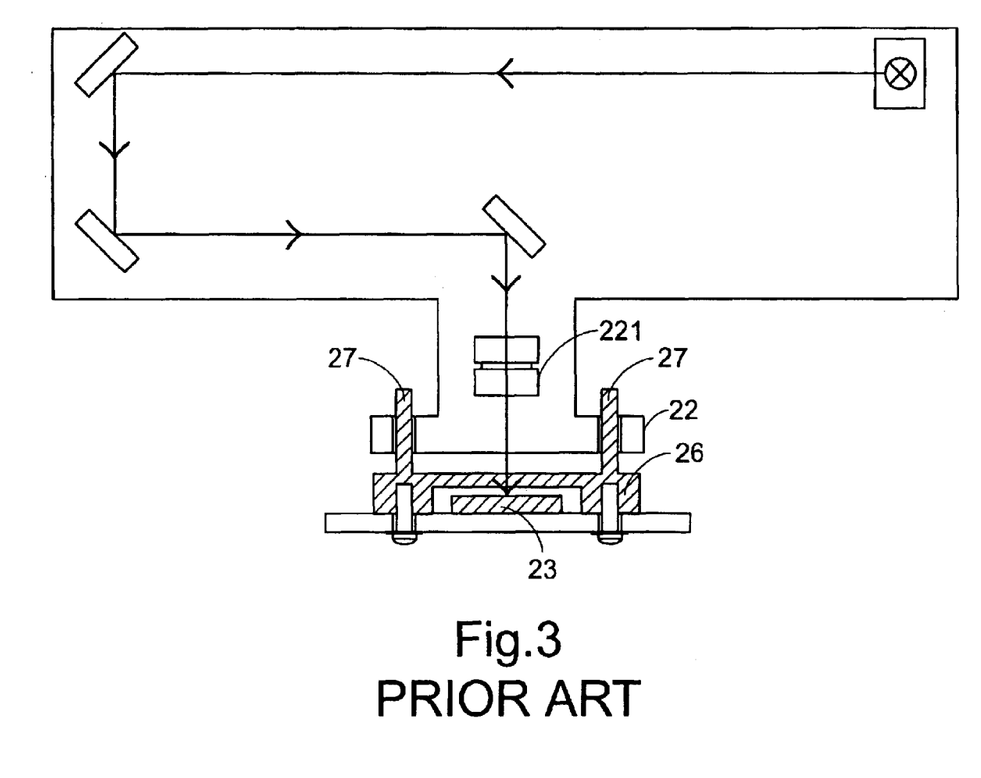
FIG. 3 is a schematic cross-sectional diagram showing another conventional assembly of a carriage module, a CCD and a circuit board.

In order to solve this problem, another securing mechanism is developed, as shown in FIG. 3. In the carriage module as shown, an additional adjusting element 26 including plugs 27, which penetrate the carriage housing 22 via through holes, is provided to adjust the level of the CCD 23 as well as the distance between the lens 221 and the CCD 23. After the proper positions of the plugs are determined, the through holes are sealed to secure the CCD 23 to the carriage module housing 22. This mechanism, however, allows only a small degree of adjustment because of the small residue space of the plugs 27 in the through holes. Moreover, such adjustment is not easily accomplished and spends a lot of time.

SUMMARY OF THE INVENTION

An object of the present invention is to provide a securing device provides an easy way to assure of the proper alignment of the CCD with the lens.

A first aspect of the present invention relates to a securing device for securing a photoelectric conversion device to a carriage module housing via a circuit board. The securing device includes a sustaining member interfacing between the photoelectric conversion device and the carriage module housing; a first coupling member arranged on the carriage module housing; and a second coupling member arranged on the sustaining member, and coupled to the first coupling member to fix the sustaining member to the carriage module housing.

Preferably, the sustaining member is sandwiched by the photoelectric conversion device and the carriage module housing. The upper and lower surfaces of the sustaining member in contact with the carriage module housing and the photoelectric conversion device are substantially in parallel with each other.

In an embodiment, the first coupling member is a first threaded hole in the carriage module housing, and the second coupling member includes a second threaded hole in the sustaining member and a free screw connecting the first and the second threaded holes together.

Preferably, the sustaining member includes a first portion clamped by the photoelectric conversion device and the carriage module housing to maintain a fixed distance therebetween, and a second portion extending from the first portion and arranged thereon the second coupling member. Specifically, the first coupling member includes a plurality of first threaded holes in the carriage module housing, and the second coupling member includes a plurality of second threaded holes in the second portion of the sustaining device and a plurality of screws connecting the first and the second threaded holes together.

Preferably, the second portion of the sustaining member is made of a flexible material such as plastic or metal.

Preferably, the securing device further comprises a third coupling member arranged on the second portion of the sustaining member and coupled to a fourth coupling member arranged on the circuit board to secure the photoelectric conversion device onto the circuit board. Specifically, the third coupling member includes a plurality of third threaded holes in the second portion of the sustaining device, and the fourth coupling member includes a plurality of fourth threaded holes in the circuit board and a plurality of screws connecting the third and the fourth threaded holes together.

A second aspect of a securing device according to the present invention comprises a sustaining member having opposite and parallel surfaces thereof in contact with the photoelectric conversion device and the carriage module housing, respectively, to maintain a substantially even distance between the photoelectric conversion device and the carriage module housing; a first number of first threaded holes arranged on the carriage module housing; the first number of second threaded holes arranged on the sustaining member; and the first number of first screws, each penetrating through one of the first threaded holes and one of the second threaded holes to fix the photoelectric conversion device to the carriage module housing.

Preferably, the securing device further comprises a second number of third threaded holes in the sustaining member; the second number of fourth threaded holes in the circuit board; and the second number of second screws, each penetrating through one of the third threaded holes and one of the fourth threaded holes to fix the photoelectric conversion device to the circuit board.

Preferably, the sustaining member includes a first portion clamped by the photoelectric conversion device and the carriage module housing to maintain the substantially even distance therebetween, and a second portion extending from the first portion and arranged thereon the second and the third threaded holes.

A securing device according to a third aspect of the present invention comprises a clamped member sandwiched between the photoelectric conversion device and the carriage module housing, and having a substantially even thickness to provide a constant distance between the photoelectric conversion device and the carriage module housing; a securing member connected to the clamped member and made of a flexible material; a first number of first threaded holes arranged on the carriage module housing; the first number of second threaded holes arranged on the securing member; the first number of first screws, each penetrating through one of the first threaded holes and one of the second threaded holes to fix the photoelectric conversion device to the carriage module housing; a second number of third threaded holes arranged on the securing member; the second number of fourth threaded holes arranged on the circuit board; and the second number of second screws, each penetrating through one of the third threaded holes and one of the fourth threaded holes to fix the photoelectric conversion device to the circuit board.

Preferably, the clamped member and the securing member are integrally formed.

The securing device according to the present invention can be used to secure a charge coupled device (CCD) to a carriage module housing of an image scanner.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 4A:
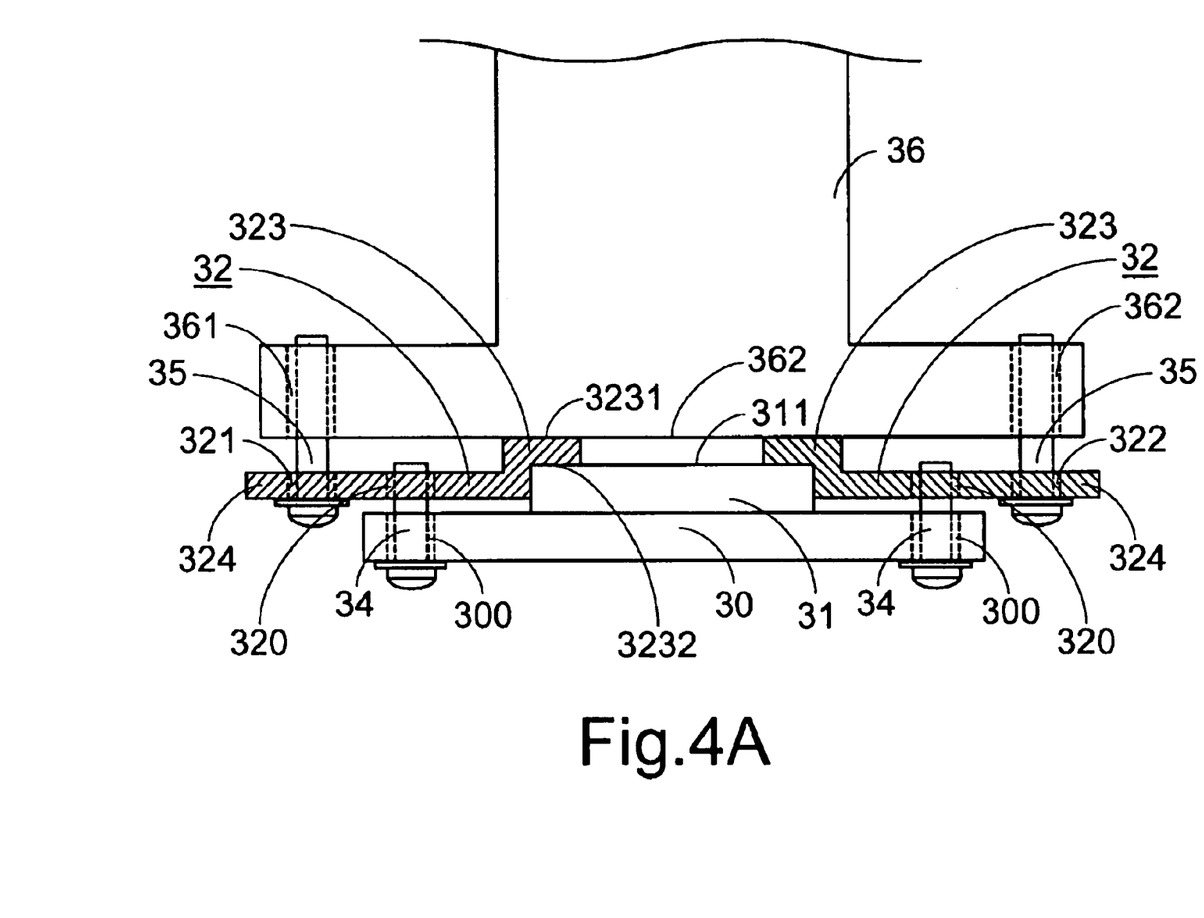
FIG. 4A is a schematic cross-sectional diagram showing an assembly of a carriage module, a CCD and a circuit board combined by a securing device according to a preferred embodiment of the present invention.
Figure 4B:
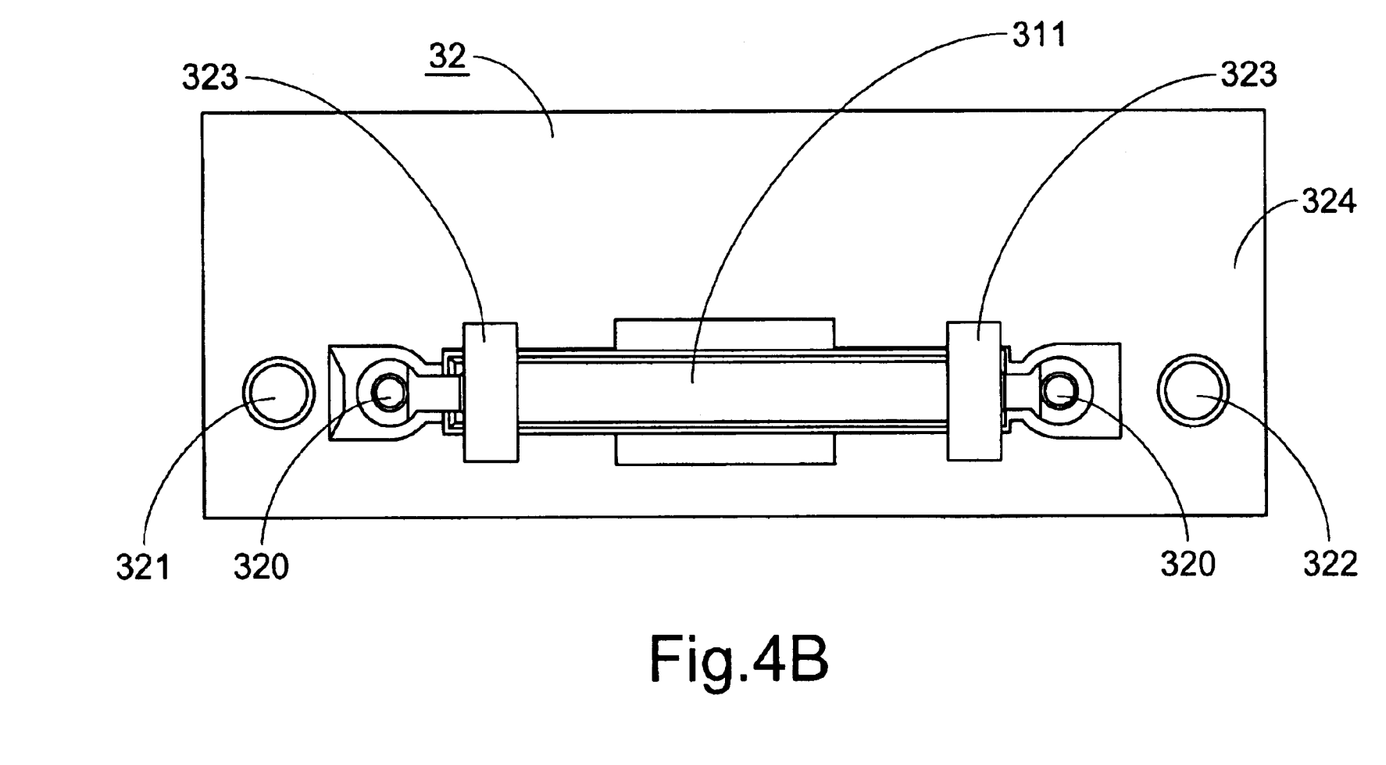
FIG. 4B is a schematic top view illustrating the combination of the CCD and the securing device in FIG. 4A.

Referring now to FIGS. 4A and 4B, a preferred embodiment of a securing device according to the present invention is illustrated. The securing device includes a sustaining member 32, a plurality of threaded holes 300, 320, 321 and 362, and a plurality of screws 34 and 35. The sustaining member 32 includes a clamped portion 323 and a securing portion 324 extending from the clamped portion 323. The clamped portion is attached to the CCD 31 to be secured, and will be interfaced between the CCD 31 and the carriage module housing 36, as shown in FIG. 4A. The thickness of the clamped portion 323 should be even enough to keep the distance between the CCD 31 and the carriage module housing 36 constant. In other words, by way of the padding of the clamped portion 323 with parallel upper and lower surfaces 3231 and 3232, the upper surface 311 of the CCD 31 can be always kept parallel to the lower face 362 and thus orthogonal to the central line of the lens (not shown) of the carriage module.

The threaded holes 300 are arranged in the circuit board 30, and the threaded holes 320 are arranged in the securing portion 324 of the sustaining member 32. Each of the threaded holes 320 is aligned with one of the threaded holes 300 so that one of the screws 34 can properly penetrate the pair of threaded holes 300 and 320 to secure the CCD 31 to the circuit board 30. On the other hand, the threaded holes 321 are arranged in the securing portion 324 and the threaded holes 361 are arranged in the carriage module housing 36, which are aligned with each other. The screws 35 then penetrate respective pairs of threaded holes to secure the securing member 32 and thus the CCD 31 and the circuit board 30 to the carriage module housing 36.

Figure 5A:
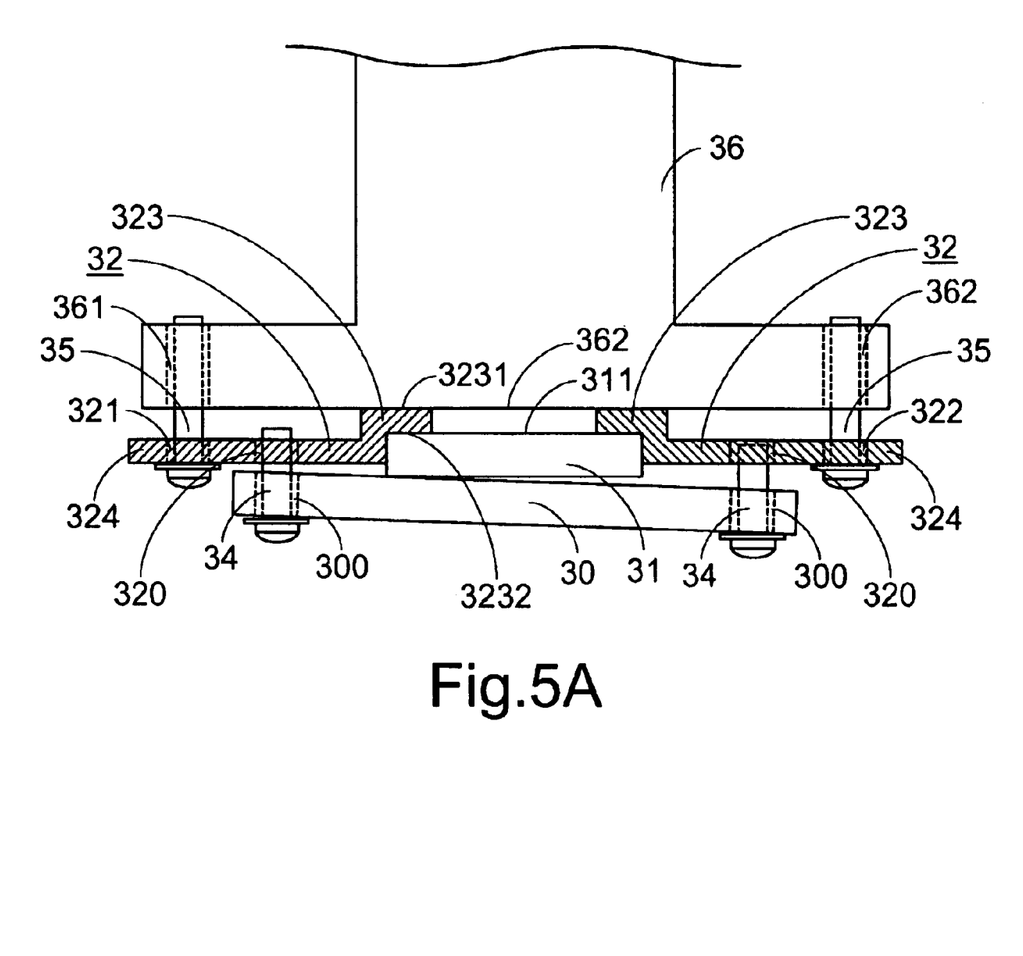
FIG. 5A is a schematic cross-sectional diagram illustrating how the securing device of FIG. 4A remedy the defective situation resulting from floating welding of the CCD to the circuit board.
Figure 5B:
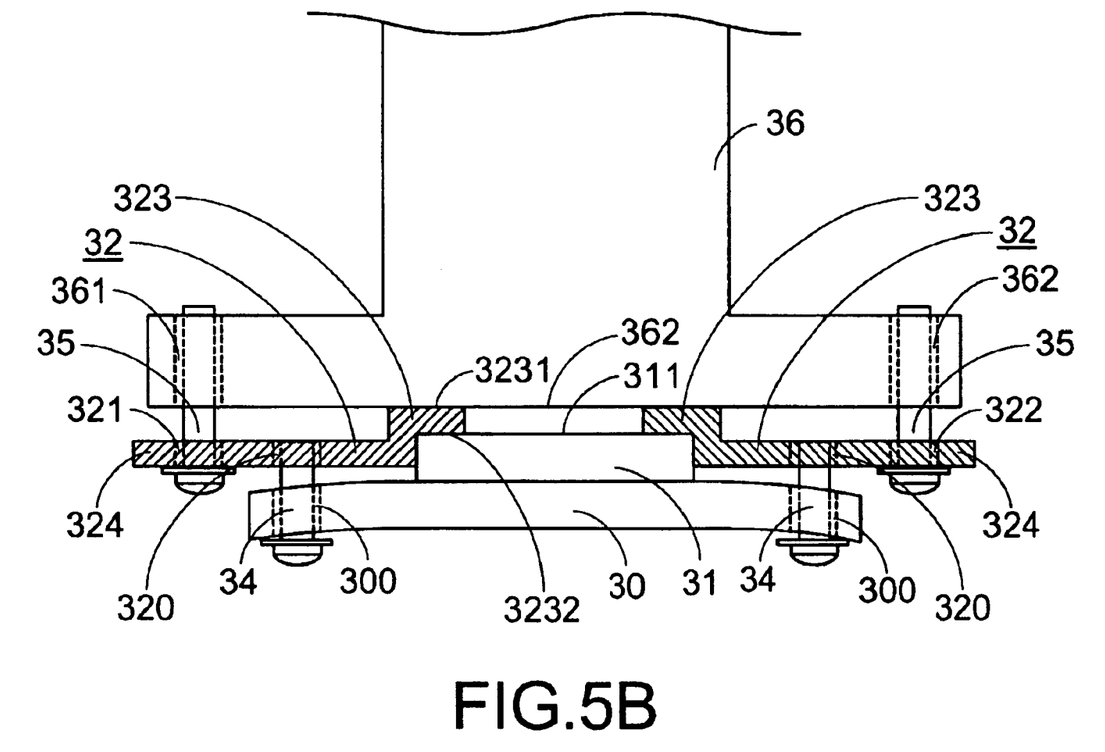
FIG. 5B is a schematic cross-sectional diagram illustrating how the securing device of FIG. 4A remedy the defective situation resulting from floating welding of the non-flat circuit board.

The clamped portion 323 and the securing portion 324 can be integrally formed, and the securing portion 324 or the integrally formed sustaining member 32 is preferably made of a flexible material such as plastic or metal. By this way, the parallel arrangement of the CCD and the lens can be assured as mentioned above, while the conventional defective situations can obtain remedy. Please refer to FIG. 5A, in which the defective situation resulting from floating welding of the CCD 31 to the circuit board 30 is shown. Due to the presence of the clamped portion 323, the upper surface 311 of the CCD 31 secured on the circuit board 30 is kept parallel to the lower face 362 of the carriage module housing 36 and thus the lens accommodated therein. Due to the flexible feature of the securing portion 324, the securing portion 324 can be slightly distorted to facilitate the screws 34 to penetrate through the threaded holes 300 and 320 which are not perfectly aligned with each other originally. Similar remedy can be achieved in a case that the circuit board is non-flat, as shown in FIG. 5B. Due to the non-flat feature, the threaded holes 300 and 320 are not perfectly aligned with each other. The slightly distortion of the securing portion 324 will improve the alignment of the threaded holes 300 and 320, and accordingly allow the well screwed of the threaded holes 300 and 320. Thus, the circuit board 30, CCD 31 and the carriage module housing 36 can be properly combined by way of the present securing device.

To sum it up, according to the present invention, the level adjustment of the CCD is not necessary any longer due to the constantly padding of the securing device between the CCD and the carriage module housing, and the screwing operations are easily made because of the flexible feature of the securing device. It is to be noted that the use of the securing device according to the present invention with a CCD and a carriage module housing of an image scanner is described for illustration only, and does not intend to limit the present invention to such scope. The present securing device can be applied to any similar apparatus requiring the photoelectric conversion device thereof to align with a certain element in a carriage module housing thereof.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A securing device for securing a photoelectric conversion device to a carriage module housing via a circuit board, comprising:

a sustaining member interfacing between said photoelectric conversion device and said carriage module housing;

a first coupling member arranged on said carriage module housing; and a second coupling member arranged on said sustaining member, and coupled to said first coupling member to fix said sustaining member to said carriage module housing.

2. The securing device according to claim 1 wherein said sustaining member is sandwiched by said photoelectric conversion device and said carriage module housing, and having upper and lower surfaces in contact with said carriage module housing and said photoelectric conversion device substantially in parallel.

3. The securing device according to claim 1 wherein said first coupling member is a first threaded hole in said carriage module housing, and said second coupling member includes a second threaded hole in said sustaining member and a free screw connecting said first and said second threaded holes together.

4. The securing device according to claim 1 wherein said sustaining member includes a first portion clamped by said photoelectric conversion device and said carriage module housing to maintain a fixed distance therebetween, and a second portion extending from said first portion and arranged thereon said second coupling member.

5. The securing member according to claim 4 wherein said first coupling member includes a plurality of first threaded holes in said carriage module housing, and said second coupling member includes a plurality of second threaded holes in said second portion of said sustaining device and a plurality of screws connecting said first and said second threaded holes together.

6. The securing device according to claim 4 wherein said second portion of said sustaining member is made of a flexible material.

7. The securing device according to claim 6 wherein said flexible material is plastic or metal.

8. The securing device according to claim 4 further comprising a third coupling member arranged on said second portion of said sustaining member and coupled to a fourth coupling member arranged on said circuit board to secure said photoelectric conversion device onto said circuit board.

9. The securing device according to claim 8 wherein said third coupling member includes a plurality of third threaded holes in said second portion of said sustaining device, and said fourth coupling member includes a plurality of fourth threaded holes in said circuit board and a plurality of screws connecting said third and said fourth threaded holes together.

10. The securing device according to claim 1 wherein said sustaining member is made of a flexible material.

11. The securing device according to claim 10 wherein said flexible material is plastic or metal.

12. The securing device according to claim 1 wherein said photoelectric conversion device is a charge coupled device (CCD).

13. The securing device according to claim 1 wherein said carriage module housing is a carriage module housing of an image scanner.

14. A securing device for securing a photoelectric conversion device to a carriage module housing via a circuit board, comprising:

a sustaining member having opposite and parallel surfaces thereof in contact with said photoelectric conversion device and said carriage module housing, respectively, to maintain a substantially even distance between said photoelectric conversion device and said carriage module housing;

a first number of first threaded holes arranged on said carriage module housing;

said first number of second threaded holes arranged on said sustaining member; and said first number of first screws, each penetrating through one of said first threaded holes and one of said second threaded holes to fix said photoelectric conversion device to said carriage module housing.

15. The securing device according to claim 14 further comprising:

a second number of third threaded holes in said sustaining member;

said second number of fourth threaded holes in said circuit board; and said second number of second screws, each penetrating through one of said third threaded holes and one of said fourth threaded holes to fix said photoelectric conversion device to said circuit board.

16. The securing device according to claim 15 wherein said sustaining member includes a first portion clamped by said photoelectric conversion device and said carriage module housing to maintain said substantially even distance therebetween, and a second portion extending from said first portion and arranged thereon said second and said third threaded holes.

17. The securing device according to claim 14 wherein said sustaining member is made of a flexible material.

18. The securing device according to claim 17 wherein said flexible material is plastic or metal.

19. A securing device for securing a photoelectric conversion device to a carriage module housing via a circuit board, comprising:

a clamped member sandwiched between said photoelectric conversion device and said carriage module housing, and having a substantially even thickness to provide a constant distance between said photoelectric conversion device and said carriage module housing;

a securing member connected to said clamped member and made of a flexible material;

a first number of first threaded holes arranged on said carriage module housing;

said first number of second threaded holes arranged on said securing member;

said first number of first screws, each penetrating through one of said first threaded holes and one of said second threaded holes to fix said photoelectric conversion device to said carriage module housing;

a second number of third threaded holes arranged on said securing member;

said second number of fourth threaded holes arranged on said circuit board; and said second number of second screws, each penetrating through one of said third threaded holes and one of said fourth threaded holes to fix said photoelectric conversion device to said circuit board.

20. The securing device according to claim 19 wherein said clamped member and said securing member are integrally formed.

* * * * *